United States Patent
Algie et al.

(10) Patent No.: US 10,838,649 B2
(45) Date of Patent: Nov. 17, 2020

(54) RELOCATING STORAGE UNIT DATA IN RESPONSE TO DETECTING HOTSPOTS IN A DISPERSED STORAGE NETWORK

(71) Applicant: International Business Machines Corporation, Armonk, NY (US)

(72) Inventors: Teague S. Algie, Chicago, IL (US); Andrew G. Peake, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/244,446

(22) Filed: Jan. 10, 2019

(65) Prior Publication Data
US 2019/0146706 A1    May 16, 2019

Related U.S. Application Data

(63) Continuation of application No. 15/193,940, filed on Jun. 27, 2016, now Pat. No. 10,235,085.

(51) Int. Cl.
*G06F 11/07* (2006.01)
*G06F 3/06* (2006.01)

(52) U.S. Cl.
CPC .......... *G06F 3/0649* (2013.01); *G06F 3/061* (2013.01); *G06F 3/0605* (2013.01); *G06F 3/067* (2013.01); *G06F 3/0616* (2013.01); *G06F 3/0647* (2013.01)

(58) Field of Classification Search
CPC .. G06F 11/1076; G06F 12/0246; G06F 3/067; H04L 65/602; H04L 67/1097
See application file for complete search history.

(56) References Cited

U.S. PATENT DOCUMENTS

| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |

(Continued)

OTHER PUBLICATIONS

Chung; An Automatic Data Segmentation Method for 3D Measured Data Points; National Taiwan University; pp. 1-8; 1998.

(Continued)

*Primary Examiner* — Ryan Bertram
*Assistant Examiner* — Trang K Ta
(74) *Attorney, Agent, or Firm* — James Nock; Andrew D. Wright; Roberts, Calderon, Safran & Cole, P.C.

(57) ABSTRACT

A method for execution by a dispersed storage and task (DST) processing unit that includes a processor includes generating storage unit heat data based on a plurality of temperature readings received from each of a plurality of storage units, where the storage unit heat data indicates a first hot storage unit. A pair of storage units is selected from the plurality of storage units based on the storage unit heat data, where the pair of storage units includes the first hot storage unit and a second storage unit. A data swap request is generated for transmission to the pair of storage units, where the data swap request includes an instruction to transfer at least one first data slice from the first hot storage unit to the second storage unit and to transfer at least one second data slice from the second storage unit to the first hot storage unit.

20 Claims, 6 Drawing Sheets

(56) References Cited

U.S. PATENT DOCUMENTS

| | | | |
|---|---|---|---|
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 3,356,949 | A1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,380,942 | B1* | 2/2013 | Corddry ............. G06F 12/0246 711/154 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0050569 | A1* | 3/2007 | Haustein ............. G06F 3/067 711/154 |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0113004 | A1 | 5/2007 | Sugimoto et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0077558 | A1 | 3/2009 | Arakawa et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0122523 | A1 | 5/2011 | Gladwin et al. |
| 2011/0161679 | A1* | 6/2011 | Grube ................. G06F 11/1076 713/193 |
| 2011/0197046 | A1 | 8/2011 | Chiu et al. |
| 2012/0311068 | A1* | 12/2012 | Gladwin ............... H04L 65/602 709/214 |
| 2012/0327582 | A1 | 12/2012 | Goodwin et al. |
| 2013/0014254 | A1 | 1/2013 | Gladwin et al. |
| 2013/0174176 | A1 | 7/2013 | Kopylovitz |
| 2014/0019823 | A1 | 1/2014 | Ramirez et al. |
| 2014/0281311 | A1 | 9/2014 | Walker et al. |
| 2015/0355960 | A1* | 12/2015 | Volvovski ........... H04L 67/1097 714/54 |
| 2016/0328179 | A1 | 11/2016 | Quinn |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

(56) References Cited

OTHER PUBLICATIONS

List of IBM Patents or Patent Applications Treated as Related, Jul. 27, 2020, 1 page.

* cited by examiner

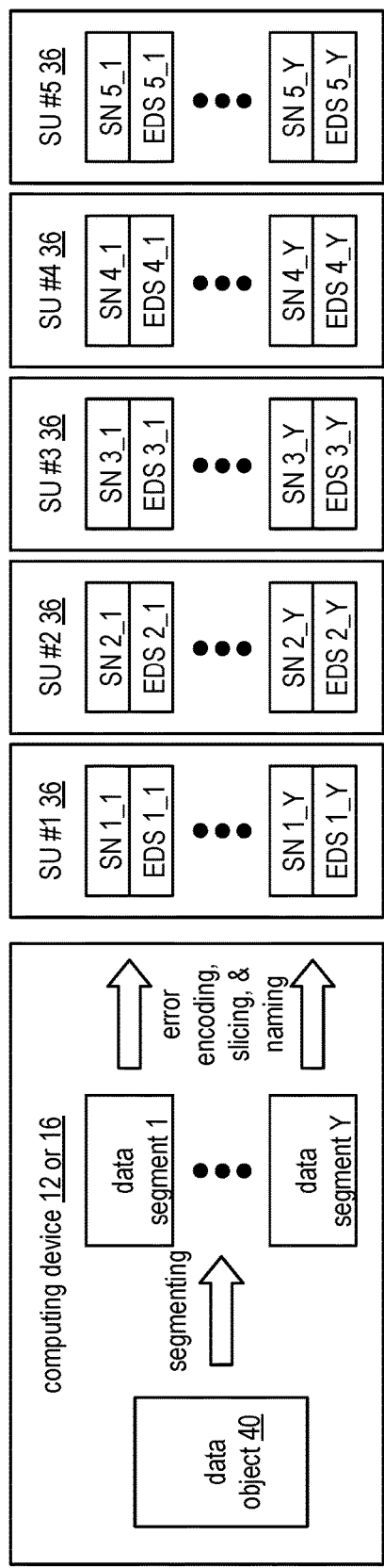
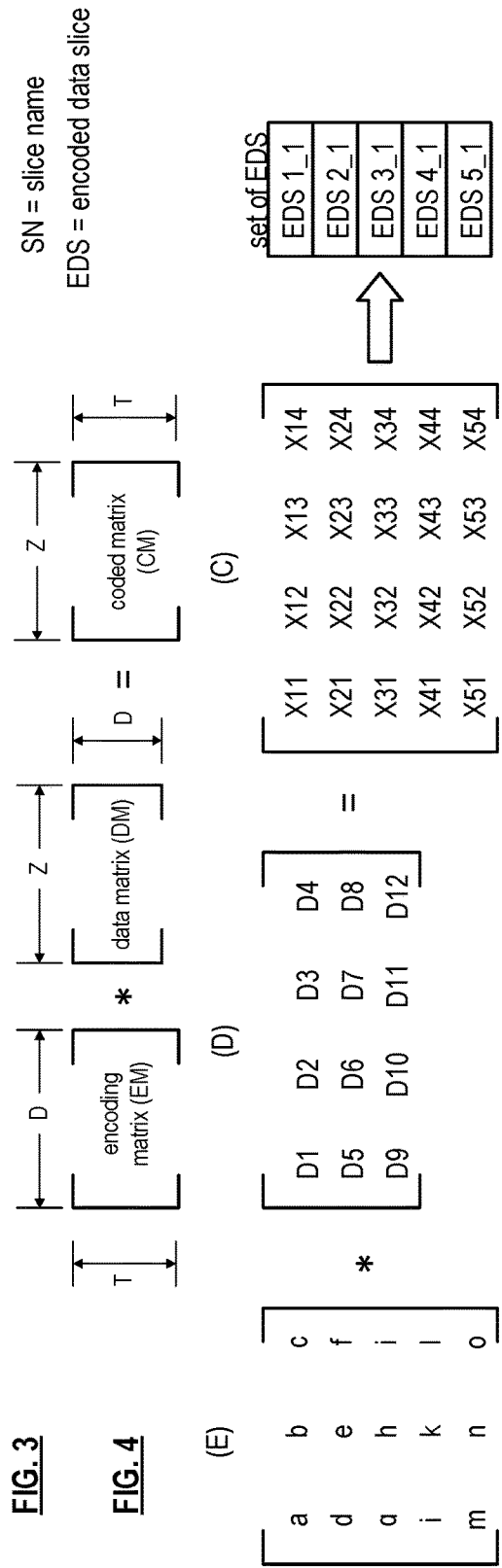
FIG. 3
FIG. 4
FIG. 5
FIG. 6

US 10,838,649 B2

RELOCATING STORAGE UNIT DATA IN RESPONSE TO DETECTING HOTSPOTS IN A DISPERSED STORAGE NETWORK

CROSS-REFERENCE TO RELATED APPLICATIONS

The present U.S. Utility Patent Application claims priority pursuant to 35 U.S.C. § 120 as a continuation of U.S. Utility application Ser. No. 15/193,940 entitled "RELOCATING STORAGE UNIT DATA IN RESPONSE TO DETECTING HOTSPOTS IN A DISPERSED STORAGE NETWORK", filed Jun. 27, 2016, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
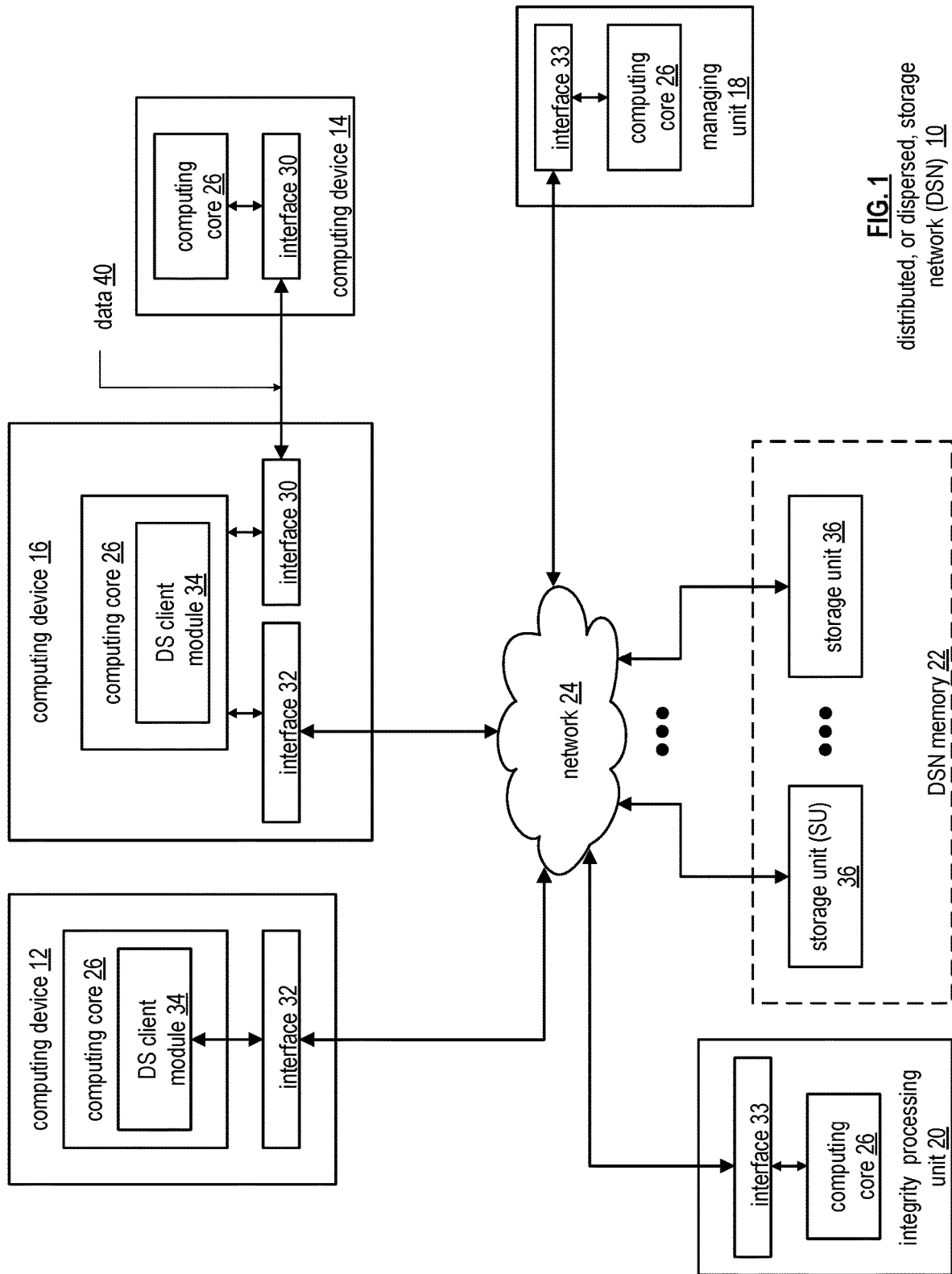
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public interne systems; and/or one or more local area networks (LAN) and/or wide area networks (WAN).

Figure 2:
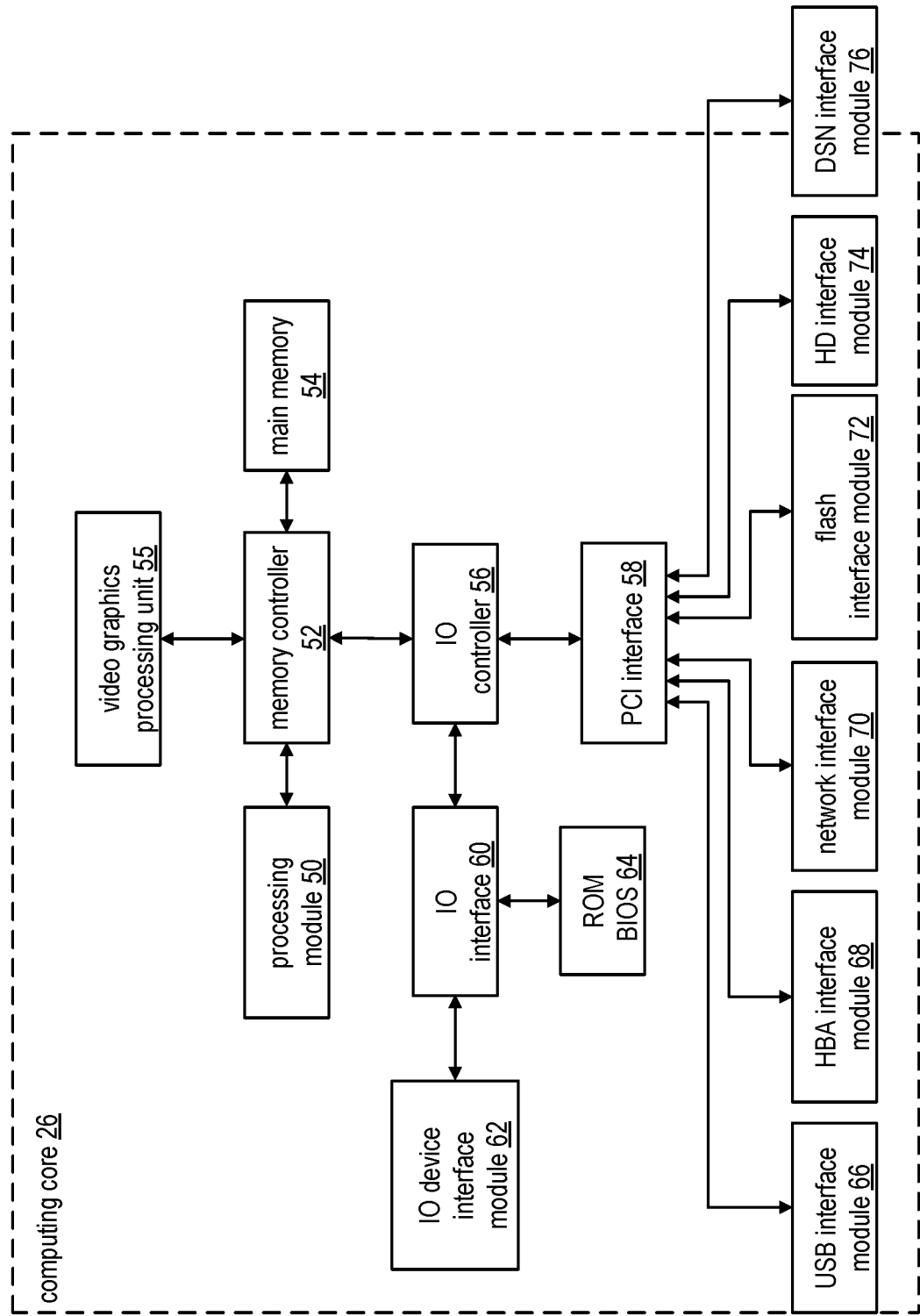
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
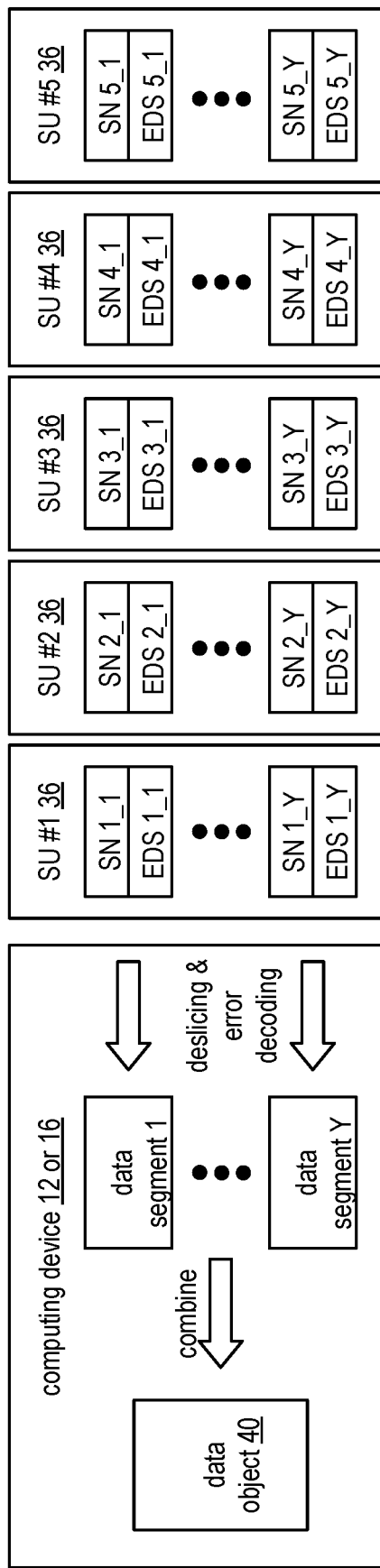
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
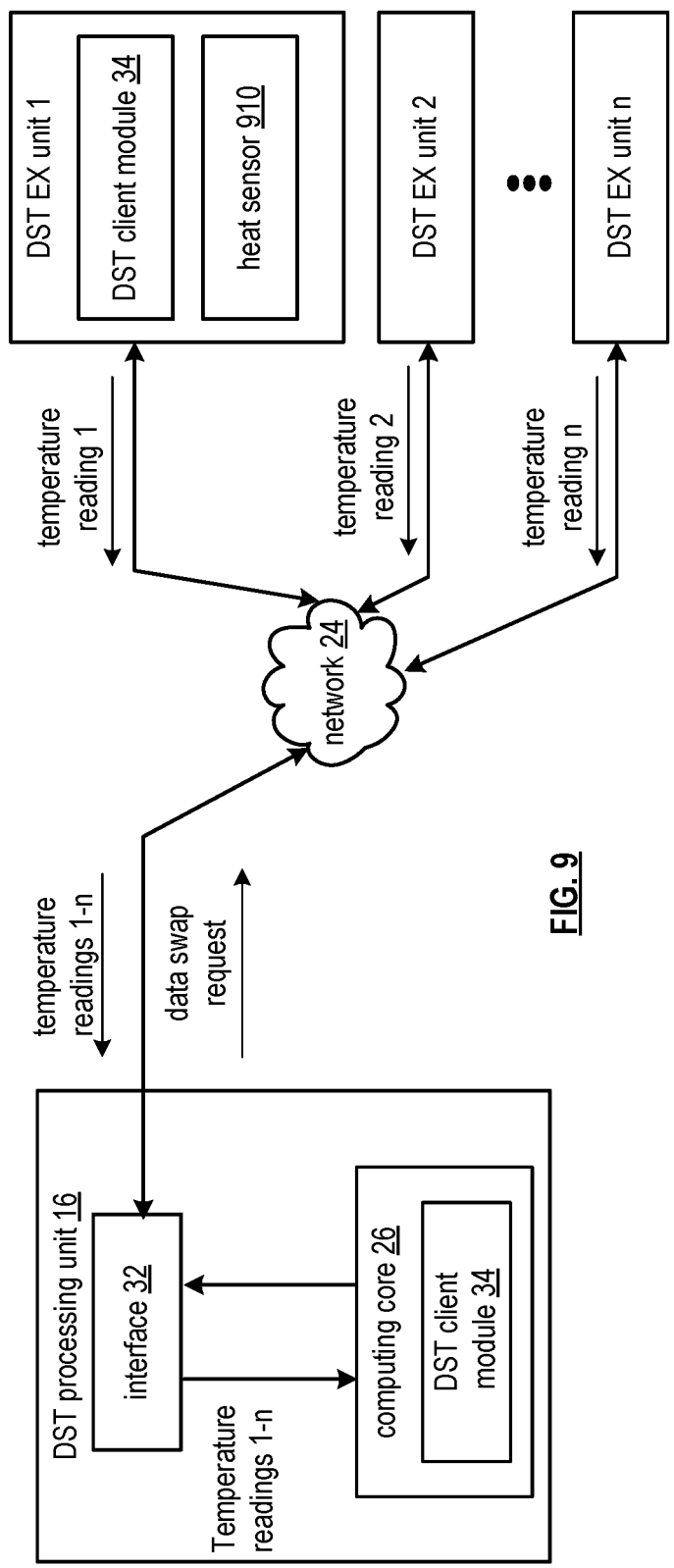
FIG. 9 is a schematic block diagram of an embodiment of a dispersed or distributed storage network (DSN) in accordance with the present invention.

FIG. 9 is a schematic block diagram of another embodiment of a dispersed storage network (DSN) that includes a distributed storage and task (DST) processing unit 16 of FIG. 1, the network 24 of FIG. 1, and a plurality of DST execution (EX) units 1-*n*. Each DST processing unit 16 can include the interface 32 of FIG. 1, the computing core 26 of FIG. 1, and the DST client module 34 of FIG. 1. Each DST execution unit includes the DST client module 34 of FIG. 1, and can include a temperature sensor 910. Hereafter, each DST execution unit may be interchangeably referred to as a storage unit. Each DST execution unit may be implemented utilizing the DST execution unit 36 of FIG. 1. The DSN functions to relocate storage unit data in response to detecting hotspots.

Running at higher levels of heat often corresponds to higher rates of component failure. Data centers often contain hotspots, corresponding to physical locations and/or physical devices that tend to have a higher temperature. Hotspots can occur even in data centers that are well-designed and well-ventilated. For example, hotspots can occur on the top level of a rack compared to a middle or bottom level. Hotspots can also occur due to proximity to devices that are highly used. Hotspots can even cause equivalent devices to vary significantly in internal temperature.

In various embodiments, reliability can be maximized in a DSN by swapping storage location of data based on the occurrence of hotspots. In various embodiments, slices stored in two or more storage units, entire vaults between storage units, and/or the entirety of data stored in two or more storage units can be swapped in response to detecting hotspots. For example, a DST processing unit can receive temperature data from the storage units in the DSN. Historical temperature over time for storage units in the DSN can be used to determine an average and/or expected temperature for each storage unit. The temperature data of a storage unit over time can be adjusted for levels of activity of that storage unit. For example, a DST processing unit can receive current temperature readings periodically from the storage units in the DSN, and can keep a record of past temperature readings and/or average temperature readings. Past temperature readings can be stored, for example, in a memory of the DST processing unit, such as memory 54 of FIG. 2. Hot storage units that are subject to significantly increased rates of failure or memory device failure can be identified, for example, by virtue of running hotter than other storage units and/or by virtue of running hotter than the historical average for that particular storage unit. Some or all of the data of these hot storage units can be relocated to cooler storage units to increase reliability of the system. For example, hot storage units can be paired with units of equivalent or near equivalent storage capacity that are running at safer, average, and/or cooler temperatures. Some or all of the data stored in each pair of storage units can be swapped accordingly. This virtual swap can include relocating slice data, identity, credentials, etc. from the cool storage unit to the hot storage unit and vice versa. For example, a DST processing unit can send requests to move some or all of the data from the hot storage unit to the cool storage unit and to move some or all of the data from the cool storage unit to the hot storage unit. In various embodiments, where there isn't enough storage between the two storage units to facilitate this swap directly, a third storage unit can be designated to temporarily store data of one storage unit to facilitate the swap. In similar embodiments, temporary storage to facilitate the swap can instead be distributed over multiple storage units with available space. In various embodiments, memory of the DST processing unit itself can be designated to temporarily store data to facilitate the swap.

In various embodiments, selecting the pairs of storage units involved in these swaps can be based on minimizing the number of hot storage units within any single "stripe" of storage units, where a stripe of storage units corresponds to a set of storage units that store data slices corresponding to the same data object, the same set of data objects, and/or the same data source. One or more storage units that are in such a stripe of storage units can be paired with storage units that are not in the stripe. In various embodiments, this strategy may be employed to keep the number of hot storage units in a stripe below a certain count or ratio. In various embodiments, a DST processing unit can determine a plurality of stripes, where each of the plurality of stripes corresponds sets of storage units storing data slices corresponding to the same data object, same set of data objects, and/or same data source. From this, the DST processing unit can determine a plurality of "high risk" stripes which correspond to stripes that are above the threshold and/or stripes that have the highest hot storage unit count or ratio, and choose to swap hot storage units of these high risk stripes. In various embodiments, the DST processing unit can also determine hot storage units that are members of multiple high-risk stripes, and further prioritize that hot storage units that are members of a greater number of high risk stripes be included in pairs to be swapped.

In various embodiments, selecting pairs of storage units involved in these swaps can be based on encoding schemes employed by some or all of the data slices of a storage unit. For example, the hot storage units can be used to serve data slices and/or entire vaults that have higher levels of fault tolerance and reliability. For example, a pair of storage units can be selected based on the fault tolerance level of some or all of the encoded data slices stored by the storage units. For example, encoded slices corresponding to a less resilient IDA configuration in a hot storage unit can be swapped with encoded slices corresponding to a more resilient IDA configuration in a cool storage unit. By employing this strategy, the hot storage units can absorb the higher rates of failure associated with the higher temperature levels without putting the data it stores at as high of a risk.

In various embodiments, temperature sensor 910 can include a thermometer, a resistance temperature detector, a thermocouple, and/or a thermistor. In various embodiments, each storage unit can include a single temperature sensor or a plurality of temperature sensors. In various embodiments, a single temperature sensor can take temperature readings for multiple storage units. In various embodiments, storage units can monitor their own temperature levels, and transmit a notification indicating temperature readings only when the temperature readings are high and/or indicate a hotspot. In other embodiments, the storage units can transmit temperature readings in regular intervals and/or in response to a request by a DST processing unit.

In various embodiments, the temperature level that deems a storage unit "hot" can be the same or different for the storage units in the DSN. In various embodiments, such a threshold for a particular storage unit can be dependent on average activity of the storage unit, average resilience of the encoding schemes employed by the data slices stored in the storage unit, and/or average importance of the data stored at the storage unit. In various embodiments, the threshold can be variable for each storage unit based on the current activity level and/or the resilience of data currently stored by the storage unit. In various embodiments, these parameters can be stored in a memory of the DST processing unit and/or a memory of the storage unit, such as memory 54 of FIG. 2.

In various embodiments, a DST processing unit and/or storage unit itself can "predict" hotspot behavior. For example, past temperature patterns can be used to correlate higher temperatures of one or more storage units to the performing certain functions and/or processes. Higher temperatures can also correlate to particular times of day regularly that may regularly correspond to higher temperatures and/or higher activity. In various embodiments, if a storage unit is currently undergoing or about to undergo an intensive process corresponding to a higher activity level, this storage unit can be designated as a hot storage unit, even without a temperature reading, as such higher activity level is predicted to correlate to higher temperature levels.

In various embodiments, rather than transferring the data from one storage unit to another, the storage units can be physically swapped. A physical swap involves physically moving the cool storage unit to the location of the hot storage unit, and the hot storage unit to the former location of the cool storage unit. For example, rather than facilitating the data transfer, the DST processing unit can instead transmit a notification indicating one or more pairs of storage units to be swapped. In response, a user associated with the DSN can physically swap the locations of the hot and cool storage unit in the pair in response to receiving the notification. In various embodiments where a physical swap is required, the DSN can select a cool storage unit that is also in a physically convenient location, for example, a cool storage unit that is adjacent to and/or on the same rack as the hot storage unit, physically close to a user that will facilitate the physical swap, located on a level of the rack that is easy for the user to reach, corresponds to hardware that is easy to carry, etc.

In various embodiments, a processing system of a dispersed storage and task (DST) processing unit includes at least one processor and a memory that stores operational instructions, that when executed by the at least one processor cause the processing system to generate storage unit heat data based on a plurality of temperature readings received from each of a plurality of storage units, where the storage unit heat data indicates a first hot storage unit. A pair of storage units are selected from the plurality of storage units based on the storage unit heat data, where the pair of storage units includes the first hot storage unit and a second storage unit. A data swap request is generated for transmission to the pair of storage units, where the data swap request includes an instruction to transfer at least one first data slice from the first hot storage unit to the second storage unit, and to transfer at least one second data slice from the second storage unit to the first hot storage unit.

In various embodiments, generating the storage unit heat data includes comparing each received temperature reading to a heat threshold. The storage unit heat data indicates the first hot storage unit in response to the received temperature reading of the first hot storage unit being above the heat threshold. In various embodiments, generating the storage unit heat data includes ranking the received plurality of temperature readings, where the first hot storage unit corresponds to a highest temperature reading of the plurality of temperature readings. In various embodiments, the received plurality of temperature readings are stored in a memory of the DST processing unit, where generating the storage unit heat data is further based on past temperature readings stored in the memory. In various embodiments, generating the storage unit heat data is further based on a plurality of activity levels received from the plurality of storage units. In various embodiments, the second storage unit is selected in response to the storage unit heat data indicating that the second storage unit has a normal temperature reading.

In various embodiments, fault tolerance data is generated based on a plurality of fault tolerance levels corresponding to the plurality of storage units, and wherein selecting the pair of storage units is further based on the fault tolerance data. In various embodiments, the second storage unit is selected in response to the fault tolerance data indicating that the at least one second data slice from the second storage unit is encoded with a higher fault tolerance than the at least one first data slice from the first hot storage unit.

In various embodiments, slice location data is generated for each of a plurality of data objects, wherein the slice location data for each of the plurality of data objects indicates a plurality of memory locations corresponding to a plurality of data slices of the data object. Each of the plurality of memory locations correspond to at least one of the plurality of storage units, and selecting the pair of storage units is further based on the slice location data of each of the plurality of data objects. In various embodiments, the storage unit heat data indicates a plurality of hot storage units which includes the first hot storage unit. The pair of storage units is selected in response to the slice location data indicating that one of the plurality of data objects has more than a threshold number of data slices stored in hot storage units, where the at least one first data slice of the first hot storage unit includes a subset of the plurality of data slices of the data object.

In various embodiments, the storage unit heat data further indicates a second hot storage unit. A second pair of storage units is selected from the plurality of storage units based on the storage unit heat data, where the pair of storage units includes the second hot storage unit and a fourth storage unit, and where the second hot storage unit is stored in a first physical location, and where the fourth storage unit is stored in a second physical location. A notification is generated for transmission indicating that the second pair of storage units need to be physically swapped by moving the second hot storage unit to second physical location and by moving the fourth storage unit to the first physical location.

Figure 10:
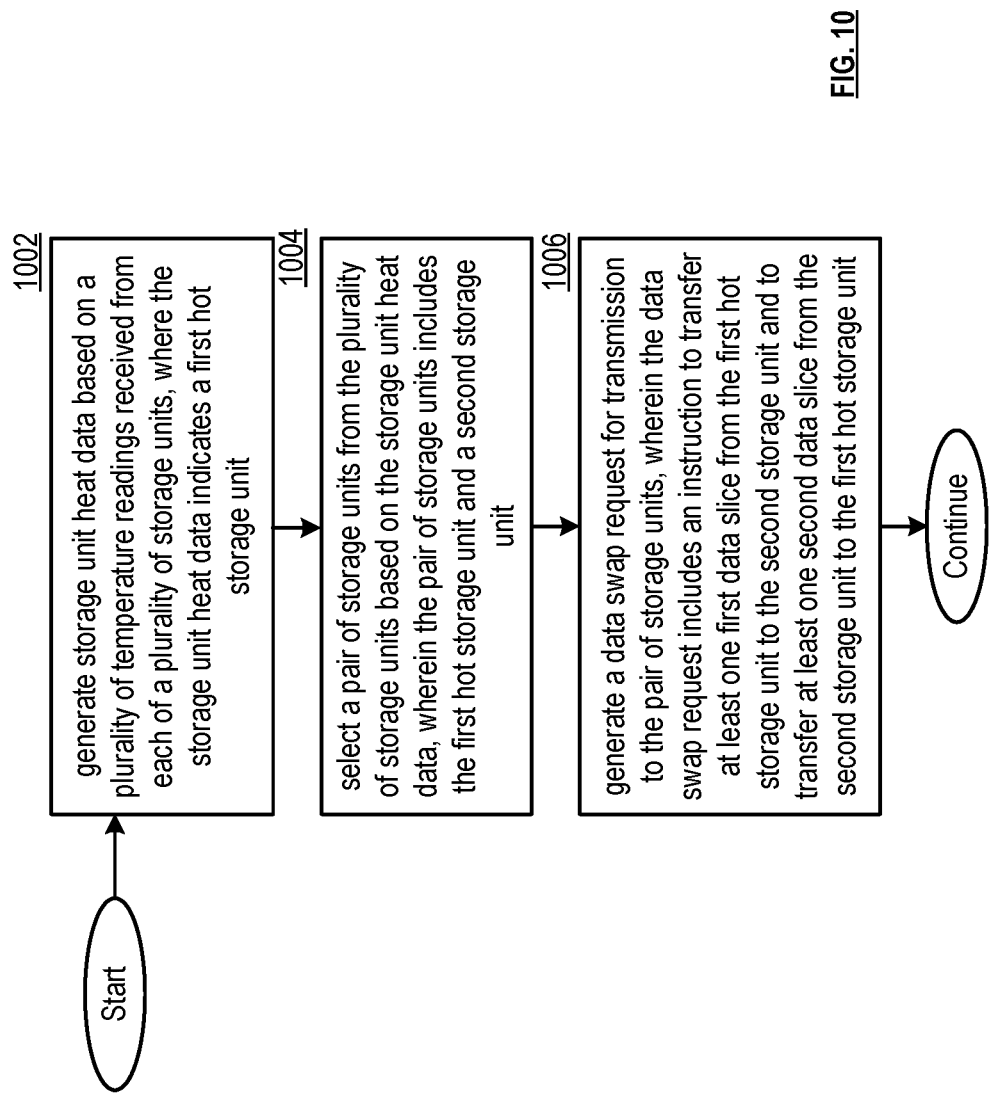
FIG. 10 is a logic diagram of an example of a method of relocating storage unit data in response to detecting hotspots in accordance with the present invention.

FIG. 10 is a flowchart illustrating an example of relocating storage unit data in response to detecting hotspots. In particular, a method is presented for use in conjunction with one or more functions and features described in conjunction with FIGS. 1-9 is presented for execution by a dispersed storage and task (DST) processing unit that includes a processor or via another processing system of a dispersed storage network that includes at least one processor and memory that stores instruction that configure the processor or processors to perform the steps described below. Step 1002 includes generating storage unit heat data based on a plurality of temperature readings received from each of a plurality of storage units, where the storage unit heat data indicates a first hot storage unit. Step 1004 includes selecting a pair of storage units from the plurality of storage units based on the storage unit heat data, where the pair of storage units includes the first hot storage unit and a second storage unit. Step 1006 includes generating a data swap request for transmission to the pair of storage units, where the data swap request includes an instruction to transfer at least one first data slice from the first hot storage unit to the second storage unit and to transfer at least one second data slice from the second storage unit to the first hot storage unit.

In various embodiments, generating the storage unit heat data includes comparing each received temperature reading to a heat threshold. The storage unit heat data indicates the first hot storage unit in response to the received temperature reading of the first hot storage unit being above the heat threshold. In various embodiments, generating the storage unit heat data includes ranking the received plurality of temperature readings, where the first hot storage unit corresponds to a highest temperature reading of the plurality of temperature readings. In various embodiments, the received plurality of temperature readings are stored in a memory of the DST processing unit, where generating the storage unit heat data is further based on past temperature readings stored in the memory. In various embodiments, generating the storage unit heat data is further based on a plurality of activity levels received from the plurality of storage units. In various embodiments, the second storage unit is selected in response to the storage unit heat data indicating that the second storage unit has a normal temperature reading.

In various embodiments, fault tolerance data is generated based on a plurality of fault tolerance levels corresponding to the plurality of storage units, and wherein selecting the pair of storage units is further based on the fault tolerance data. In various embodiments, the second storage unit is selected in response to the fault tolerance data indicating that the at least one second data slice from the second storage unit is encoded with a higher fault tolerance than the at least one first data slice from the first hot storage unit.

In various embodiments, slice location data is generated for each of a plurality of data objects, wherein the slice location data for each of the plurality of data objects indicates a plurality of memory locations corresponding to a plurality of data slices of the data object. Each of the plurality of memory locations correspond to at least one of the plurality of storage units, and selecting the pair of storage units is further based on the slice location data of each of the plurality of data objects. In various embodiments, the storage unit heat data indicates a plurality of hot storage units which includes the first hot storage unit. The pair of storage units is selected in response to the slice location data indicating that one of the plurality of data objects has more than a threshold number of data slices stored in hot storage units, where the at least one first data slice of the first hot storage unit includes a subset of the plurality of data slices of the data object.

In various embodiments, the storage unit heat data further indicates a second hot storage unit. A second pair of storage units is selected from the plurality of storage units based on the storage unit heat data, where the pair of storage units includes the second hot storage unit and a fourth storage unit, and where the second hot storage unit is stored in a first physical location, and where the fourth storage unit is stored in a second physical location. A notification is generated for transmission indicating that the second pair of storage units need to be physically swapped by moving the second hot storage unit to second physical location and by moving the fourth storage unit to the first physical location.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a dispersed storage and task (DST) processing unit that includes a processor, the method comprising:

selecting a pair of storage units from a plurality of storage units based on storage unit heat data, the plurality of storage units including a plurality of hot storage units, the pair of storage units including a first hot storage unit of the hot storage units and a second storage unit, the pair of storage units being selected in response to determining that one of a plurality of data objects has more than a threshold number of a corresponding plurality of data slices stored in the plurality of hot storage units, and the storage unit heat data further indicating a second hot storage unit;

generating a slice swap request for transmission to the pair of storage units;

selecting a second pair of storage units from the plurality of storage units based on the storage unit heat data, the second pair of storage units including the second hot storage unit and a fourth storage unit, the second hot storage unit being stored in a first physical location, and the fourth storage unit being stored in a second physical location; and generating a notification for transmission recommending that the second pair of storage units be physically swapped.

2. The method of claim 1, wherein the data slice swap request includes an instruction to transfer at least one first data slice from the first hot storage unit to the second storage unit and an instruction to transfer at least one second data slice from the second storage unit to the first hot storage unit, and the at least one first data slice of the first hot storage unit includes a subset of the corresponding plurality of data slices of the one of the plurality of data objects.

3. The method of claim 1, wherein the storage unit heat data is based on comparing temperature readings received from the plurality of storage units to a heat threshold, the storage unit heat data identifying the first hot storage unit in response to the received temperature reading of the first hot storage unit being above the heat threshold.

4. The method of claim 3, further comprising ranking the temperature readings, the first hot storage unit corresponding to a highest temperature reading of the temperature readings.

5. The method of claim 3, further comprising storing the temperature readings in a memory of the DST processing unit, wherein the storage unit heat data includes past temperature readings stored in the memory of the DST processing unit.

6. The method of claim 1, wherein the storage unit heat data is based on a plurality of activity levels received from the plurality of storage units.

7. The method of claim 1, wherein the second storage unit is selected in response to the storage unit heat data indicating that the second storage unit has a normal temperature reading.

8. The method of claim 2, further comprising generating fault tolerance data based on a plurality of fault tolerance levels corresponding to the plurality of storage units;
wherein selecting the pair of storage units from the plurality of storage units is further based on the fault tolerance data; and
the second storage unit is selected in response to the fault tolerance data indicating that the at least one second data slice from the second storage unit is encoded with a higher fault tolerance than the at least one first data slice from the first hot storage unit.

9. The method of claim 1, further comprising generating slice location data for each of the plurality of data objects,
wherein each of the plurality of data objects are dispersed storage error encoded to produce a plurality of encoded data slices,
the slice location data for each of the plurality of data objects indicates a plurality of memory locations corresponding to the plurality of encoded data slices of the each of the plurality of data objects,
each of the plurality of memory locations correspond to at least one of the plurality of storage units, and
the determining that the one of a plurality of data objects has more than a threshold number of data slices stored in the plurality of hot storage units is based on the slice location data of the one of the plurality of data objects.

10. The method of claim 1, wherein the notification includes recommending moving the second hot storage unit to the second physical location and moving the fourth storage unit to the first physical location.

11. A processing system of a dispersed storage and task (DST) processing unit, comprising:
at least one processor; and
a memory that stores operational instructions that when executed by the at least one processor cause the processing system to:
select a pair of storage units from a plurality of storage units based on storage unit heat data, the plurality of storage units including a plurality of hot storage units, the pair of storage units including a first hot storage unit of the hot storage units and a second storage unit, the pair of storage units being selected in response to determining that one of a plurality of data objects has more than a threshold number of a corresponding plurality of data slices stored in the plurality of hot storage units, and the storage unit heat data further indicating a second hot storage unit;
generate a data swap request for transmission to the pair of storage units, the data swap request including an instruction to transfer at least one first data slice from the first hot storage unit to the second storage unit and an instruction to transfer at least one second data slice from the second storage unit to the first hot storage unit, the at least one first data slice of the first hot storage unit including a subset of the corresponding plurality of data slices of the one of the plurality of data objects;
select a second pair of storage units from the plurality of storage units based on the storage unit heat data, the second pair of storage units including the second hot storage unit and a fourth storage unit, the second hot storage unit being stored in a first physical location, and the fourth storage unit being stored in a second physical location; and
generate a notification for transmission recommending that the second pair of storage units be physically swapped.

12. The processing system of claim 11, wherein the storage unit heat data is based on comparing temperature readings received from the plurality of storage units to a heat threshold, the storage unit heat data indicating the first hot storage unit in response to the received temperature reading of the first hot storage unit being above the heat threshold.

13. The processing system of claim 11, wherein the operational instructions, when executed by the at least one processor, further cause the processing system to store the plurality of temperature readings in a memory of the DST processing unit,
wherein the storage unit heat data includes past temperature readings stored in the memory of the DST processing unit.

14. The processing system of claim 11, wherein the storage unit heat data is based on a plurality of activity levels received from the plurality of storage units.

15. The processing system of claim 11, wherein the operational instructions, when executed by the at least one processor, further cause the processing system to generate fault tolerance data based on a plurality of fault tolerance levels corresponding to the plurality of storage units;
wherein selecting the pair of storage units from the plurality of storage units is further based on the fault tolerance data; and
the second storage unit is selected in response to the fault tolerance data indicating that the at least one second data slice from the second storage unit is encoded with a higher fault tolerance than the at least one first data slice from the first hot storage unit.

16. The processing system of claim 11, wherein the operational instructions, when executed by the at least one processor, further cause the processing system to generate slice location data for each of a plurality of data objects,
wherein each of the plurality of data objects are dispersed storage error encoded to produce a plurality of encoded data slices,
the slice location data for each of the plurality of data objects indicates a plurality of memory locations corresponding to the plurality of encoded data slices of the each of the plurality of data objects,
each of the plurality of memory locations correspond to at least one of the plurality of storage units, and
the determining that the one of a plurality of data objects has more than a threshold number of data slices stored in the plurality of hot storage units is based on the slice location data of the one of the plurality of data objects.

17. The processing system of claim 11, wherein the notification includes recommending moving the second hot storage unit to the second physical location and moving the fourth storage unit to the first physical location.

18. A non-transitory computer readable storage medium comprises: at least one memory section that stores operational instructions that, when executed by a processing system of a dispersed storage network (DSN) that includes a processor and a memory, causes the processing system to:
select a pair of storage units from a plurality of storage units based on storage unit heat data, the plurality of storage units including a plurality of hot storage units, the pair of storage units including a first hot storage unit of the hot storage units and a second storage unit, the pair of storage units being selected in response to determining that one of a plurality of data objects has more than a threshold number of a corresponding plurality of data slices stored in the plurality of hot storage units, and the storage unit heat data further indicating a second hot storage unit;

generate a data swap request for transmission to the pair of storage units, the data swap request including an instruction to transfer at least one first data slice from the first hot storage unit to the second storage unit and an instruction to transfer at least one second data slice from the second storage unit to the first hot storage unit, the at least one first data slice of the first hot storage unit including a subset of the corresponding plurality of data slices of the one of the plurality of data objects;

select a second pair of storage units from the plurality of storage units based on the storage unit heat data, the second pair of storage units including the second hot storage unit and a fourth storage unit, the second hot storage unit being stored in a first physical location, and the fourth storage unit being stored in a second physical location; and generate a notification for transmission recommending that the second pair of storage units be physically swapped.

19. The non-transitory computer readable storage medium of claim 18, wherein the storage unit heat data includes a comparison between a temperature of the first hot storage unit and a historical average temperature of the first hot storage unit.

20. The non-transitory computer readable storage medium of claim 18, wherein the storage unit heat data indicates that the second storage unit has a lower temperature than the first hot storage unit.

* * * * *